Aug. 30, 1949.  A. L. CUPP  2,480,121
CRADLE FOR FLATCARS
Filed Oct. 10, 1944
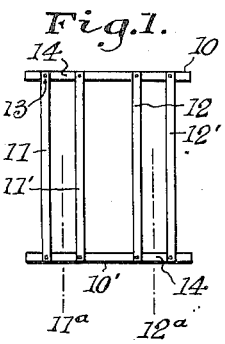
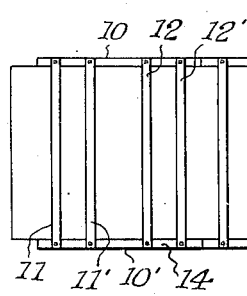
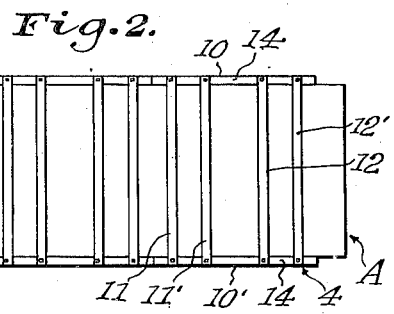
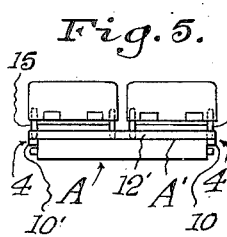
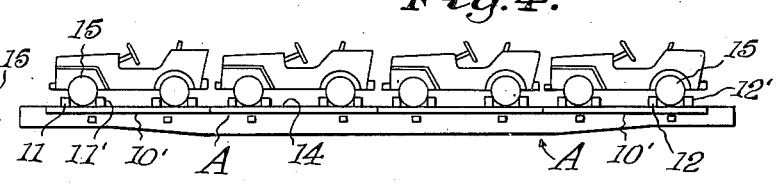
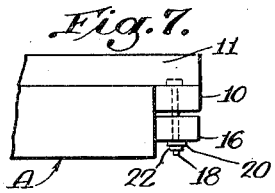
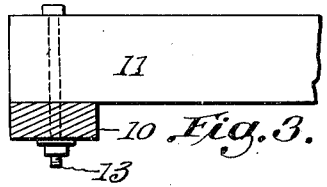
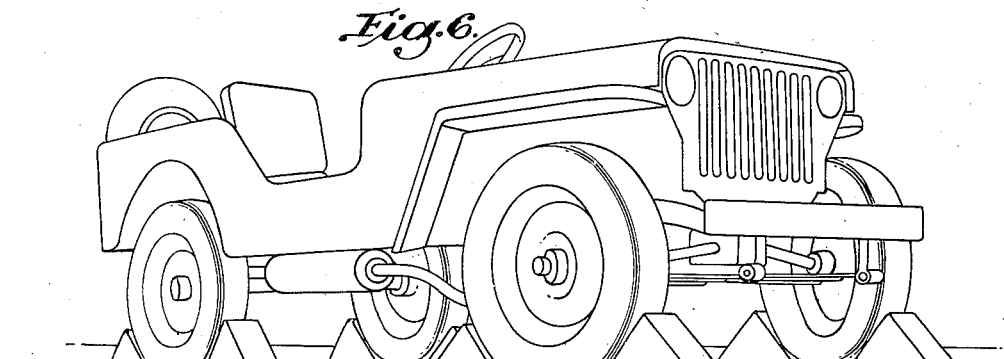
Inventor
Alfred L. Cupp
By Francis F. Sandewith and Joseph F. Crowe
Attorneys Patented Aug. 30, 1949

2,480,121

UNITED STATES PATENT OFFICE 2,480,121

CRADLE FOR FLATCARS

Alfred L. Cupp, Alexandria, Va.

Application October 10, 1944, Serial No. 558,059

1 Claim. (Cl. 105—368)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a cradle for railway flatcars. Its primary object is to adapt such flatcars for transporting vehicles in such a manner as to obtain maximum freight capacity with a minimum of flatcar surface. A further object is to provide such a cradle which, in addition to increasing the supporting capacity of the flatcar, functions, when installed, as a chock block to limit movement of the transported vehicles during passage, thereby eliminating the necessity for the additional labor and material required to properly secure said vehicles against loss or damage during movement. The increase in the supporting capacity of the flatcar is effected without increasing the overall length or width of the flatcar.

In transporting motor vehicles by railroad, using the one-quarter ton military truck, familiarly known as a "jeep," merely for the purpose of illustration, it has been found that only four of these can be placed on the average flatcar due to its length and narrow width. Such vehicles are substantially narrower than the width of the average flatcar and yet are not narrow enough to permit placing two of them side by side on such a car.

By the use of the present invention, the capacity of the average flatcar is doubled for the loading of vehicles of the type mentioned and also makes it available for loading other exceptionally wide vehicles by slightly extending its width for vehicle transport purposes without interfering with or restricting the normal rail traffic movements of said flatcar over the railway systems now in use, and without making any structural alterations in said flatcar. When not in use for transporting vehicles, the cradle forming this invention may be removed from the car and stored.

The average flatcar in normal traffic use is approximately nine feet four inches wide. This is a standard flatcar width. Cars of greater width are available but are not normally manufactured and are not usually available in sufficient quantities to meet emergency demands, as the average width flatcar of the character mentioned above suffices for normal requirements. The present invention adapts such standard width flatcar for emergency use as a car of greater width and obviates the necessity for the construction of special flatcars to meet these emergency needs.

Other important objects of the invention will appear by reference to the accompanying drawings and specification, embodying one practical form of the invention:

In the drawings—

Figure 1 is a plan view of the cradle forming this invention.

Figure 2 is a similar view showing a series of said cradles installed upon the surface of a flatcar.

Figure 3 is an enlarged detail, partly in section, showing the manner of constructing the cradle.

Figure 4 is a diagrammatic side elevation showing the invention in use, with a number of vehicles supported thereby.

Figure 5 is a rear view of the embodiment shown in Figure 4.

Figure 6 is a view showing the manner of loading vehicles prior to the use of the present invention.

Fig. 7 is a fragmentary end view showing means for securing the cradle of the present invention to the stake pockets of the car to which the cradle is applied.

In the drawings a railroad flatcar is shown at A. The cradle to be applied thereto is shown in Figure 1, comprising longitudinal members or bars 10, 10' and pairs of transverse members or bars 11, 11', 12, 12', which are firmly joined together where they meet by means of bolts 13, or any other suitable fastening means.

The transverse members are designed to rest upon the surface of the flatcar platform A', as shown in Figure 2, with their ends overhanging the sides thereof as at 4. The longitudinal members are spaced from each other a distance equal to, or slightly greater than, the width of the platform, so that when the cradle is applied thereto, said longitudinal members lie closely adjacent the sides thereof, over the stake pockets 9. The longitudinal members 10, 10', should not be greater in width than the width of the stake pocket so as not to increase the overall width of the flatcar. When in position, the top surfaces 14 of the longitudinal members are coincident with the top surface A' of the flatcar. In handling some types of equipment, it may be desirable to place the longitudinal members on top of the transverse bars. The cradle is suitably removably fastened to the platform or stake pockets 16 by bolts, spikes, straps, wire, or other means 18, the fastening means 18 being shown as a bolt which passes through the longitudinal bar 10 and through the stake pocket 16, the bolt 18 being held by a plate 20 bearing against the stake pocket underneath thereof, and locked by a nut 22. This fastening is repeated for each platform section as many times as may be necessary to assure a firm securing of the platform sections to the car.

In each cradle, the transverse bars are arranged in pairs 11, 11' and 12, 12' and are made up into a framework by being secured to the longitudinal members 10, 10' as described above and shown in Figure 1. Each pair of transverse bars is spaced from its adjoining pair by a distance which is substantially equal to that of the wheelbase of the vehicles to be transported. This distance may be established by striking an imaginary line 11a, 12a centrally between each pair of transverse members and measuring the distance between said lines. The transverse bars of each pair are so spaced and arranged with respect to said imaginary line as to form a chock for the front and rear of each wheel supported thereon.

By the use of this cradle two vehicles may be placed side by side on a flat car as shown in Figure 5, whereas without it the average flatcar width could accommodate only one, as shown in Figure 6. The outside wheels 15 of the vehicles rest on the longitudinal members 10, 10', supported in front and rear by the transverse members which function as chock blocks and also as cleats for attaching tie-downs to limit forward, rearward or upward movement of the vehicles. The inside wheels of each vehicle rest on the platform of the car, similarly supported in front and rear so as to limit longitudinal movement. It will be obvious that the cradle may be made of wood, iron, steel, or other suitable material. For ease in handling, the cradle for the full length of the car may be made up in sections, as shown in Figure 2. Each section will accommodate two vehicles, placed side by side, or, in the case of exceptionally wide vehicles, one vehicle, and as many sections as are required may be used.

The present invention permits "double decking" in the manner well known in the art. In the case of the one-quarter ton military truck referred to herein, by reversing the direction of the upper vehicle with respect to the lower one, it has been found that the lower one will efficiently support the upper one without any framework or additional support. The stacking of one vehicle above another is known as "doubledecking" and is widely utilized to increase the payload of the flatcar. By this means sixteen one-quarter ton military trucks have been carried by one flatcar.

The cradle constitutes a preformed chock block which is simple in construction and easy of application. Its use eliminates the very considerable amount of labor formerly required to install separate chock blocks for each wheel. The transverse members may be used, instead of installing separate cleats, for attaching tie-down straps or wires from the fronts and rears of vehicles either by passing these under the members or through holes which may be provided therein. Cleats, however, may be used if desired. The foregoing description is intended primarily by way of illustration and exemplification and many obvious changes may be necessary according to the nature of the vehicles shipped. It will be obvious, for example, that for greater ease in handling, the unit shown in Figure 1 may be made in two sections by cutting the longitudinal bars in two midway of their length. While the specification and claims refer to "vehicle" transport, it is not intended to limit the invention thereto, as it is intended that the invention may be applied to any transportable object Other changes may be made without departing from the spirit of the invention as defined by the appended claim.

I claim as my invention:

A removable cradle for temporarily increasing the effective width of a standard flatcar deck without increasing the overall width or length of the car and designed for transport of vehicles disposed in side-by-side relation, the said cradle being composed of a plurality of separate sections, each section comprising parallel laterally spaced bars adapted to extend longitudinally along the sides of a flatcar above the usual stake pockets of the car with their upper surfaces flush with the deck surface of the car, the inside of the longitudinal bars engaging the sides of the flatcar, pairs of chock bars connected to the said laterally spaced bars and secured thereto at the ends of the said chock bars, the said chock bars being arranged in spaced pairs, the individual bars of each pair being spaced to grip each wheel of the vehicles being transported forwardly and rearwardly thereof for preventing rolling of the vehicles during transport while allowing the wheels to rest on the deck of the flatcar, each pair of the bars having its central longitudinal axis spaced from the corresponding axis of the adjacent pair by a distance equal to that of the wheelbase of the vehicles being transported, the said cradle increasing the effective width of the deck of the flatcar in an amount permitting the vehicles to be loaded on the car in side-by-side relation as well as end-to-end, without increase in the overall width of the car, and means for removably securing each section of the cradle to the stake pockets.

ALFRED L. CUPP.

REFERENCES CITED

The following references are of record in the file of this patent:

Car Builders' Cyclopedia of 1931, Figure 183, page 200, and Figure 184, page 201.

Car Builders' Cyclopedia of 1946, Fig. 2.405, page 190, and Fig. 2.410, page 194.